United States Patent [19]

Webster

[11] 4,020,567
[45] May 3, 1977

[54] METHOD AND STUTTERING THERAPY APPARATUS

[76] Inventor: Ronald L. Webster, P.O. Box 9737, Hollins College, Va. 24020

[22] Filed: Oct. 16, 1974

[21] Appl. No.: 515,341

Related U.S. Application Data

[63] Continuation of Ser. No. 322,618, Jan. 11, 1973, abandoned.

[52] U.S. Cl. .............................. 35/35 C; 179/1 SP
[51] Int. Cl.² ...................................... G09B 19/04
[58] Field of Search .................. 35/1, 8 R, 8 A, 10, 35/13, 35 C, 9 R; 40/28.3; 128/1 R; 179/1 SA, 1 SB, 1 VC, 1 VS, 15 BF, 1 N, 1 SP; 324/98

[56] References Cited

UNITED STATES PATENTS

| | | | |
|---|---|---|---|
| 2,416,353 | 2/1947 | Shipman et al. | 35/1 |
| 3,234,332 | 2/1966 | Belar | 179/1 |
| 3,387,090 | 6/1968 | Bridges | 179/1 SP |
| 3,411,153 | 11/1968 | Steele | 179/1 SA X |
| 3,463,885 | 8/1969 | Upton | 179/1 SP |
| 3,496,465 | 2/1970 | Schroeder | 179/1 SA X |
| 3,546,584 | 12/1970 | Scarr | 179/1 SA X |
| 3,667,138 | 6/1972 | Cohen | 35/35 C |

*Primary Examiner*—Richard C. Pinkham
*Assistant Examiner*—Vance Y. Hum
*Attorney, Agent, or Firm*—Burns, Doane, Swecker & Mathis

[57] ABSTRACT

A method and apparatus is utilized in the detection of certain characteristics in the speech of stutterers as they participate in a program which reconstructs the basic properties of speed sounds. The method of speech therapy for stutterers includes transducing a patient's speech into an electrical signal and comparing the transduced signal to a reference signal representative of the desired speech target behavior. The comparison is initiated when the amplitude of the transduced speech signal exceeds a threshold related to minimal sound level. When the amplitude of the transduced speech signal exceeds that of the reference signal, the subject is visually advised of an error in his speech. When the amplitude of the transduced speech signal remains above the trigger threshold and below the reference signal, the subject is visually advised that a correct speech response has been made. In a second embodiment, the rate of change of the amplitude of the subject's speech signal is compared with a reference related to the desired target behavior.

24 Claims, 11 Drawing Figures

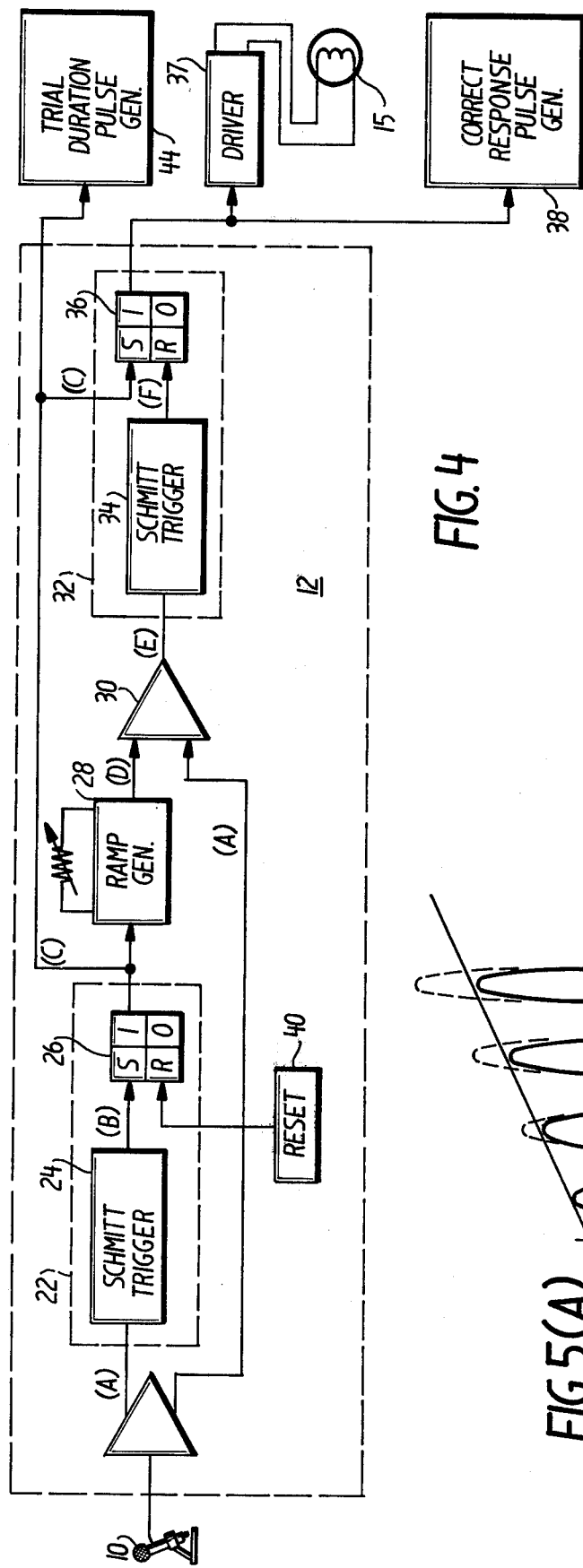
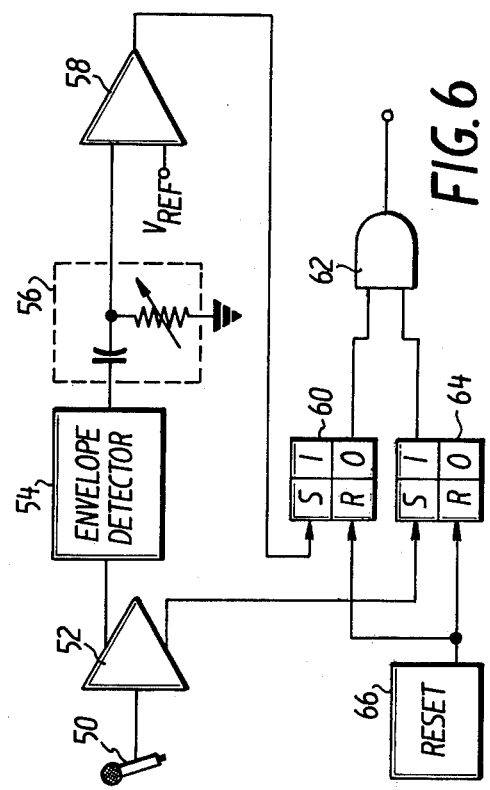
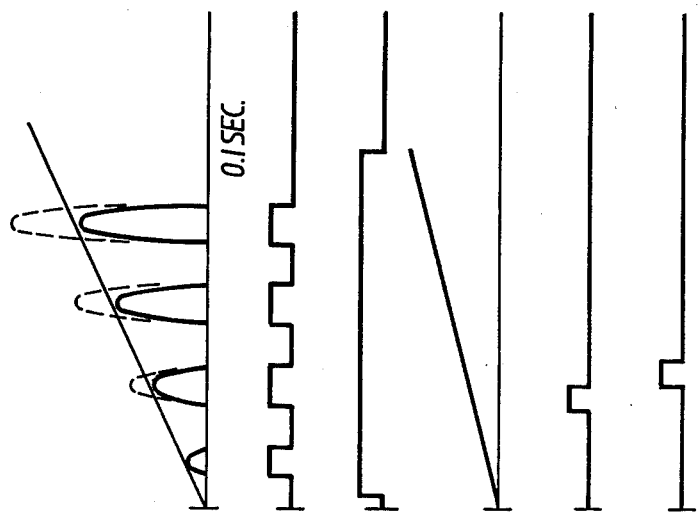
FIG. 4
FIG. 6
FIG. 5(A)
FIG. 5(B)
FIG. 5(C)
FIG. 5(D)
FIG. 5(E)
FIG. 5(F)

METHOD AND STUTTERING THERAPY APPARATUS

This is a continuation of application Ser. No. 322,618, filed Jan. 11, 1973, now abandoned.

BACKGROUND OF THE INVENTION

This invention relates to a method and apparatus for use in the treatment of stuttering and more particularly to a method of detecting and indicating speech onset errors in stutterers who are participating in a program of therapy that reconstructs the form of the detailed gestures from which speech originates.

Children and adults who stutter have substantial difficulty in overcoming the handicap because of limitations in detecting certain aberrant characteristics of their own speech. Normally, the therapist must try to explain the various detailed characteristics of correct and incorrect sounds. Because in the reconstruction of speech the stutterer must modify minute aspects of speech behavior, it is difficult to cause the subject to attend to the details of his speech in a correct and efficient manner.

While the reasons for stuttering are not clearly known, it has been demonstrated that the handicap may be reduced or eliminated by the systematic reconstruction of the stutterer's speech behaviors. However, certain difficulties exist in causing stutters to attend adequately to the detailed characteristics of their own speech. Specifically, within each syllable the amplitude rise time of the voiced component must fall beneath a certain value if stuttering is to be avoided. Therefore, it may be seen that it is difficult for the therapist to either make rapid, reliable judgments about the subject's behavior or to provide adequate feedback to the subject about the adequacy of his speech responses.

There is thus a need for a system by which the subject is made aware of the correctness or incorrectness of his speech responses in a direct, reliable manner. It will be appreciated that the therapist may not be able to react sufficiently quickly to indicate to the subject the onset of a speech error in time for the subject to recognize just exactly what he has done wrong. Moreover, it is both tedious and time consuming for a human being to be constantly present and attentive to one subject, and the instruction of a number of subjects simultaneously is virtually impossible.

It is therefore an object of this invention to provide a novel method and apparatus for the therapy of stutterers.

It is another object of this invention to provide a novel method and apparatus by which a subject in therapy may be given immediate feedback about the adequacy of his responses.

It is still another object of this invention to provide a novel method and apparatus for use in the treatment of stuttering in which a subject may be given an indication of correct or incorrect response during the initial formation of each syllable which the subject is to pronounce.

It is a further object of this invention to provide a novel method and apparatus for use in the treatment of stuttering in which the amplitude of the response of a subject in the pronunciation of a syllable relative to a reference amplitude is utilized as an indication of correctness.

It is a still further object of the present invention to provide a novel method and apparatus for use in the treatment of stuttering in which the growth rate of the response of a subject in the pronunciation of a syllable relative to a reference value is utilized as an indication of correctness.

These and many other objects and advantages of the present invention will be readily apparent to one skilled in the art to which the invention pertains from the claims and from a perusal of the following detailed description when read in conjunction with the appended drawings.

BRIEF DESCRIPTION OF THE DRAWINGS

FIG. 4 is a more detailed functional block diagram of the system of FIG. 1;

FIGS. 5 (a)–5 (f) are a timing diagram illustrating signals occuring at various places in the system of FIG. 4; and, FIG. 6 is a functional block diagram of a second embodiment.

DETAILED DESCRIPTION OF A PREFERRED EMBODIMENT

One of the problems of stutters is the occurrence of unusually high voice amplitudes during the initial formation of a syllable by a person who stutters. Moreover, in the formation of a syllable there may be a unusual growth in the amplitude of the sound emitted by the subject as that syllable is being formed. It has been found that, regardless of the syllable being formed, a normal growth rate in the amplitude of the sounds emitted by a subject can be ascertained. While the relative amplitudes of the sounds emitted during stuttering nd during normal speech may not ordinarily be reliably compared over the entire duration of the syllable, it has been found that such a comparison is valid during the initial formation of the syllable.

Figure 1:
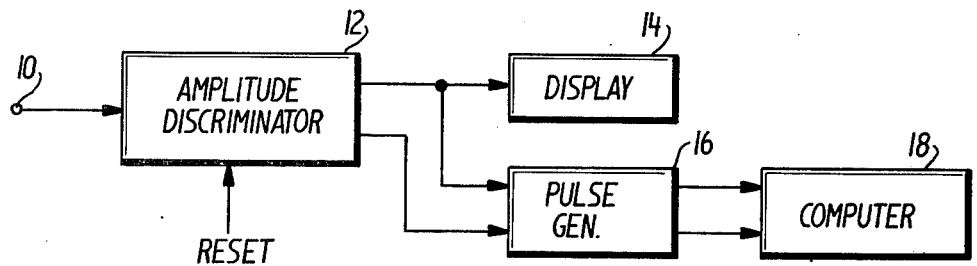
FIG. 1 is a functional block diagram of the system of the invention.

With reference now to FIG. 1, the system of the present invention may include a microphone 10 operably coupled to an amplitude discriminator circuit 12. The output signal from the amplitude discriminator circuit 12 may be applied to a suitable conventional display 14 and to a pulse generator 16. The pulse generator 16 may be connected to a properly programmed general purpose digital computer 18, or a suitable special purpose digital or analog computer to monitor responses of the subject.

In operation, the amplitude discriminator may be reset to an initial condition before each trial syllable. The subject may then be asked to pronounce a syllable. The subject's voice is transduced by the microphone 10 to provide an electrical input signal to the amplitude discriminator circuit 12. The amplitude discriminator circuit 12 detects when, in the initial formation of a syllable, the voice signal amplitude is excessive. Once the error is detected, the amplitude discriminator circuit 12 may generate a signal which is applied to the display 14 to indicate the fact of an error to the subject. Simultaneously with this indication, a signal may be generated by the amplitude discriminator circuit 12 for application to the pulse generator 16 to indicate that a syllable has been pronounced and the correctness of the subject's response. These signals may be applied to the computer 18 so that the responses of the subject during programmed exercises can be recorded. It is desirable that the computer, on the basis of the subject's performance, indicate that additional words be repeated or that advancement may be made to the next exercise.

In one embodiment, the amplitude discriminator circuit 12 may be activated at the minimal voice signal level capable of being produced by the subject. The growth rate of the voice signal may then be monitored for approximately 100 milliseconds after it rises above this minimum threshold level. Simultaneously with the attainment of this minimum threshold, a lamp or other suitable indicator on the display 14 may be energized. If the growth rate of the transduced voice signal meets certain predetermined criteria, the indicator lamp may remain energized until the entire system is reset for the next syllable. The subject is advised by the continuously lighted lamp that he did not error in pronouncing the syllable. If at any time during the initial pronunciation (i.e., the first 100 milliseconds) the sounds emitted by the subject do not meet the predetermined criteria, the amplitude discriminator circuit 12 may generate an error signal to extinguish the lamp until the system is reset for the next word. Thus, the lamp may be lighted when the subject initiates speech and may be extinguished in the event of an error. Because of the briefness of the 100 millisecond sample period, the lamp will not appear to be lighted except in the absence of an error. Before the end of a trial syllable, the subject is thus advised of a correct response by the lighted lamp.

By using the amplitude discriminator circuit 12 and display 14 in conjunction with a programmed textbook, with the guidance of a trained therapist, the subject may be given a constant flow of reliable information about the adequacy of his speech behavior. The system illustrated in FIG. 1 also permits the therapist to work simultaneously with a number of subjects.

Figure 2:
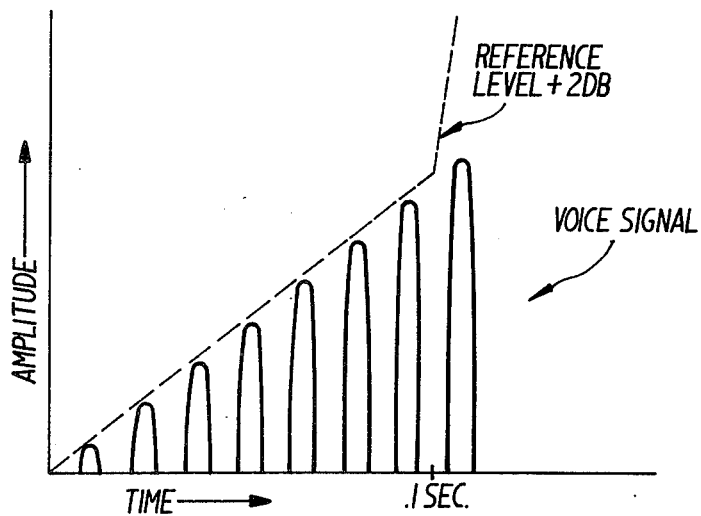
FIG. 2 is a graph illustrating the growth rate in a normal voice signal for the pronunciation of a syllable.

The criterion by which the response of the subject is judged may be the growth rate in the amplitude of the voice signal. As illstrated in FIG. 2 by the positive excursions of the transduced voice signal in the normal formation of a syllable, a growth rate may be established as an amplitude ramp. This amplitude ramp, illustrated in phantom, may after the initial formation of the first part of a word, e.g., 100 milliseconds, be increased to exclude subsequent positive excursions of the signal in the detection of errors. Alternatively, the generating of an error signal by the discriminator circuit 12 of FIG. 1 may be inhibited after 100 milliseconds.

It will be apparent that within the first 100 milliseconds after an audible sound containing an error is emitted by a subject, the amplitude of his voice will exceed the reference level illustrated in phantom.

Figure 3:
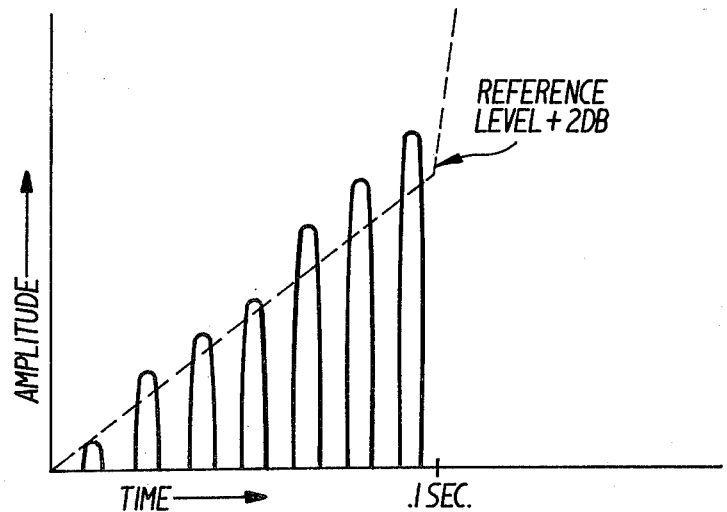
FIG. 3 is a graph illustrating the growth rate of a typical voice signal associated with an incorrect voice onset in the pronunciation of a syllable.

As indicated in FIG. 3, a reference level may be established, with a 2 dB margin for error, as a reliable indication of speech onset errors. A system for establishing this reference level will be described below. However, as indicated in FIG. 3, this reference level will be exceeded within the first 100 milliseconds of syllable formation by the amplitude of an incorrect signal.

Referring now to FIG. 4, the amplitude discriminator circuit 12 of FIG. 1 may include a suitable conventional preamplifier 20 for amplifying the signal transduced by the microphone 10. The preamplifier 20 may produce two output signals which are isolated one from the other by conventional emitter-follower buffer stages within the preamplifier. The first one of these output signals, signal (A), may be applied to a first logic circuit 22 including a Schmitt trigger circuit 24 operably connected to the set input terminal S of a bistable multivibrator or flip-flop 26. The output signal from the "true" output terminal of the multivibrator 26 may be applied to a suitable conventional integrator or ramp generator 28 which generates a voltage ramp for the duration of a "high" logic level signal from the multivibrator 26. The ramp generator 28 may be reset responsively to the loss of the signal at the input terminal thereof.

The voltage ramp signal generated by the ramp generator 28 may be applied to one of two input terminals of a suitable conventional comparator circuit 30 to which the other of the output signals from the preamplifier 20 is also applied by way of the other of the two input terminals. When the amplitude of the signal from the preamplifier 20 exceeds that of the voltage ramp signal from the ramp generator 28, the comparator 30 generates an error signal for application to a second logic circuit 32.

The second logic circuit 32 may include a Schmitt trigger circuit 34 operably connected to the reset input terminal R of a bistable multivibrator circuit or flip-flop 36. The output signal from the "true" output terminal of the multivibrator 36 may be applied to a driver circuit 37 for a lamp 15 in the display 14 of FIG. 1. The "true" output terminal of the multivibrator 36 may also be connected to a "correct response" pulse generator 38 which generates a pulse responsive to the termination of the multivibrator 36 output signal. The reset input terminal R of the multivibrator 26 may receive from a reset circuit 40 a signal to remove the high signal level from the "true" output terminal thereof.

The "true" output terminal of the multivibrator 26 may also be connected to the set input terminal S of the multivibrator 36 as well as to a "trial duration" pulse generator 44 which provides an output signal in response to the terminal of the signal from the "true" output terminal of the multivibrator 26. This "trial duration" pulse in thus generated responsively to the resetting of the multivibrator 26 after each trial.

In operation and with reference to the waveforms of FIG. 5, a pulse from the reset circuit 40 places the multivibrator 26 and the multivibrator 36 in a initial condition such that the ramp generator 28 is off and such that the lamp 15 is unlighted. The subject is then asked to pronounce a particular syllable or word. The voice of the subject is transduced by the microphone 10 and amplified by the preamplifier 20 for application as waveform (A) to the ramp generator 28. When the subject's voice as represented by signal (A) reaches a predetermined minimum amplitude, the Schmitt trigger circuit 24 provides a signal illustrated as waveform (B) which is utilized to trigger the multivibrator 26 to produce an output signal as illustrated in waveform (C).

In one embodiment, the output signal (waveform C) from the multivibrator 26 rises quickly from a nonimal voltage to +4volts. The output signal from the multivibrator 26 also sets the multivibrator 36 to energize the lamp 15.

Responsive to the setting of the multivibrator 26, the ramp generator 28 initiates the generation of a voltage ramp (waveform D) having a predetermined slope.

This linear voltage ramp (waveform D) is applied to the comparator 30 for comparison with the transduced voice signal (waveform A). In the event that the amplitude of the voice signal (waveform A) exceeds that of the ramp signal (waveform D), an output signal illustrated as waveform (E) is generated by te comparator circuit to reset the multivibrator 36 and extinguish the lamp 15 thus indicating to the subject that his response is unacceptable.

Should the voice signal (waveform A) remain less than the voltage ramp signal (waveform D) for 100 milliseconds, the comparator 30 is saturated and no error signal will be generated by the comparator. In the absence of an error signal, the lamp 15 will remain lighted until the system is reset thereby indicating a acceptable response by the subject. The subject thus receives positive reinforcement in that correct responses are affirmatively indicated by the lamp 15.

If, however, the subject's voice signal as indicated in phantom in waveform (A) exceeds the reference level of the voltage ramp signal (waveform D, a error signal (waveform E) will be generated by the comparator 30 to reset the multivibrator 36 and to extinguish the lamp 15. As earlier explained, the lamp 15 does not appear to go on and off since the lamp is initially on for only 100 milliseconds in the event of an unacceptable rise time.

If the subject has given a correct response, pulse generators 38 and 44 may simultaneously produce pulses indicating a trial and a correct response. In the event of a incorrect response, the pulses are not to be produced simultaneously. The simultaneity of pulse production or lack thereof can be detected by conventional coincidence circuits (not shown) within the computer 18 for record keeping and decision making purposes.

In another embodiment, the evaluation of the rate of change in the amplitude of the subject's speech is substituted for the evaluation of amplitude against a time varying reference.

With reference to FIG. 6, a suitable conventional microphone 50 may be utilized to transduce the speech of the subject into an electrical signal which may be applied through a suitable conventional amplifier 52 to an envelope detector 54. The output signal from the envelope detector 54 may be differentiated by any suitable conventional means such as the RC circuit 56 illustratad to provide an output signal representative of the rate of change of the envelope of speech amplitude. This output signal may be compared with a predetermined voltage reference in a suitable conventional comparator circuit 58.

As with the embodiment of FIG. 4, the circuit of FIG. 6 may be provided with a suitable reset circuit and an indicator to provide immediate feedback as to the adequacy of the subject's responses.

In the embodiment illustrated in FIG. 6, the output signal from the comparator 58 may be utilized to set a binary element or flip-flop 60 and to thus inhibit an AND gate 62 to which the false output terminal is connected. The output signal from the amplifier 52 may also be utilized to set a second binary element or flip-flop 64 thereby enabling the AND gate 62. A suitable reset circuit 66 may be utilized to reset both of the flip-flops 60 and 64 as well as the differentiator circuit 56 if so desired.

By appropriate selection of components, the embodiment of FIG. 6 may be utilized to monitor the flow of speech rather than the onset of discrete words or syllables. Saturation of the amplifier and envelope detector may be utilized to limit the detection of changes in rise time and the reduction of the voice signal to near zero between words and between some syllables in words permits the monitoring of the next sound.

In operation, the initiation of speech will set the flip-flop 64 to enable the AND gate 62 to illuminate an indicator (not shown). In the absence of an error, the flip-flop will remain in a reset condition and the indicator will remain lighted. In the event of a speech error, the flip-flop 60 will be set to inhibit the AND gate 62 and thus extinguish the indicator.

ADVANTAGES AND SCOPE OF THE INVENTION

A method and apparatus for the instruction of stutterers has been provided which permits the training of a number of subjects by a single therapist. The subject may be advised of speech onset errors which he may not be able to detect easily and a record may be conveniently kept of the subject's responses for evaluating the effects of the therapy.

By the use of the present invention, a single therapist may simultaneously assist several subjects. Moreover, the timing of the indicator illumination is such that positive reinforcement is provided for a correct response. The accuracy and speed of indications by the instrument exceeds that attainable with a therapist.

The present invention may be embodied in other specific forms without departing from the spirit or essential characteristics thereof. For example, the circuit elements disclosed may be easily replaced with other circuit elements which provide the same function. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of speech therapy comprising the steps of:
   a. providing a electrical signal related to a subject's speech;
   b. providing in response to the speech related electrical signal a time varying reference electrical signal related in amplitude to an acceptable amplitude for the subject, the amplitude being independent of the subject's speech;
   c. comparing the electrical signals for a predetermined time interval; and,
   d. indicating the results of the comparison.

2. The method of claim 1 wherein the predetermined time interval is not greater than about 0.2 seconds.

3. The method of claim 1 wherein the predetermined time interval is not greater than about 0.1 second.

4. The method of claim 1 wherein the electrical signal related to a subject's speech is provided by detecting the rate of change in the amplitude of the sounds enunciated during pronunciation of a word from a time when the amplitude of the sounds exceeds a first predetermined threshold to a predetermined time thereafter.

5. A method of speech therapy comprising the steps of:
   a. detecting the rate of change in the amplitude of sounds enunciated during pronunciation of a word from a time when the amplitude of the sounds exceed a first predetermined threshold to a predetermined time thereafter;

b. comparing the detected rate of change in the amplitude of the enunciated sounds to a predetermined acceptable rate of change in amplitude, the predetermined rate of change in amplitude being independent of the identity of any sounds enunciated; and, c. indicating the results of the comparison.

6. The method of claim 5 wherein the predetermined time interval is not greater than about 0.2 seconds.

7. The method of claim 6 wherein the predetermined time interval is not greater than about 0.1 second.

8. Speech therapy apparatus comprising:
means for providing a signal related to the sounds enunciated by a subject;
means for providing a predetermined time varying reference signal unrelated to a specific sound;
means for comparing said enunciated sound relate signal against said predetermined time varying reference signal; and,
means for indicating to the subject the occurrence of a predetermined relationship between said signals.

9. The apparatus of claim 8 wherein the relationship between the sounds enunciated by the subject and said enunciated sound related signal is amplitude; and,
wherein said indicating means is responsive to the comparsion of said signals only within a predetermined time interval initiated by the enunciation of sounds by the subject.

10. The apparatus of claim 9 wherein said time interval is less than about 0.2 seconds.

11. The apparatus of claim 8 wherein the signal provided by said means for providing a signal related to the sounds enunciated by a subject is related to the rate of change of sounds enunciated by a subject.

12. Speech therapy apparatus comprising:
a microphone;
a ramp generator responsive to said microphone;
a comparator operably connected to said microphone and to said ramp generator; and,
an indicator responsive to said comparator.

13. The apparatus of claim 12 including means for effectively inhibiting said indicator a predetermined time after said ramp generator responds to said microphone.

14. The apparatus of claim 13 wherein said predetermined time interval is less than about 0.2 seconds in duration.

15. Speech therapy apparatus comprising:
means for providing a signal related to the sounds enunciated by a subject;
means for providing a predetermined time varying reference signal;
means for comparing said enunciated sound related signal against said predetermined time varying reference signal; and,
means for indicating to the subject the occurrence of a predetermined relationship between said signals,
said signal providing means including a microphone, and
said comparing means including a ramp generator responsive to said microphone and a comparator operably connected to said microphone and to said ramp generator.

16. Speech therapy apparatus comprising:
means for providing a signal related to the sounds enunciated by a subject;
means for providing a time varying reference signal;
means for comparing said enunciated sound related signal against said predetermined time varying reference signal; and,
means for indicating to the subject the occurrence of a predetermined relationship between said signals,
said signal providing means including a microphone and a ramp generator, and
said comparing means including a comparator operably connected to said microphone and to said ramp generator.

17. A method of speech therapy comprising the steps of:

a. providing a electrical signal related to a subject's speech;

b. providing in response to the electrical signal related to the subject's speech a time varying reference electrical signal related in amplitude to an acceptable amplitude for the subject;

c. comparing the electrical signals for a predetermined time interval; and, d. indicating the results of the comparison.

18. The method of claim 17 wherein the predetermined time interval is not greater than about 0.2 seconds.

19. The method of claim 17 wherein the predetermined time interval is not greater than about 0.1 second.

20. Speech therapy apparatus comprising:
means for providing a signal related to the sounds enunciated by a subject;
means for providing a predetermined time varying reference signal in response to said sound related signal;
means for comparing said enunciated sound related signal against said predetermined time varying reference signal; and,
means for indicating to te subject the occurrence of a predetermined relationship between said signals.

21. The apparatus of claim 20 wherein the relationship between the sounds enunciated by the subject and said enunciated sound related signal is amplitude; and,
wherein said indicating means is responsive to the comparison of said signals only within a predetermined time interval initiated by the enunciation of sounds by the subject.

22. The apparatus of claim 21 wherein said time interval is less than about 0.2 seconds.

23. Speech therapy apparatus comprising:
means for providing a predetermined reference signal related to the rate of change of amplitude of sounds enunciated by a subject;
means for providing a predetermined reference signal unrelated to a specific sound; control means establishing a predetermined time interval initiated by the enunciation of sounds by the subject; and,
means for indicating to the subject the occurrence of a predetermined relationship between said signals during said predetermined time interval.

24. The apparatus of claim 23 wherein said time interval is less than about 0.2 seconds.

* * * * *